United States Patent [19]

Bousaid

[11] 4,438,814
[45] Mar. 27, 1984

[54] OIL RECOVERY METHOD EMPLOYING ALTERNATE SLUGS OF SURFACTANT AND FRESH WATER

[75] Inventor: Issam S. Bousaid, Houston, Tex.

[73] Assignee: Texaco Inc., White Plains, N.Y.

[21] Appl. No.: 411,172

[22] Filed: Aug. 25, 1982

Related U.S. Application Data

[63] Continuation-in-part of Ser. No. 193,323, Oct. 2, 1980, abandoned, which is a continuation-in-part of Ser. No. 71,211, Aug. 30, 1979, abandoned.

[51] Int. Cl.$^3$ .............................................. E21B 43/22
[52] U.S. Cl. .................................................. 166/273
[58] Field of Search ............ 166/273, 274, 275, 305 R

[56] References Cited

U.S. PATENT DOCUMENTS

| | | | |
|---|---|---|---|
| 3,346,047 | 10/1967 | Townsend et al. | 166/273 |
| 3,421,582 | 1/1969 | Fallgatter | 166/273 |
| 3,500,920 | 3/1970 | Raifsnider | 166/273 |
| 3,500,922 | 3/1970 | O'Brien et al. | 166/273 |
| 3,612,182 | 10/1971 | Raifsnider | 166/273 X |

*Primary Examiner*—Stephen J. Novosad
*Assistant Examiner*—George A. Suchfield
*Attorney, Agent, or Firm*—Robert A. Kulason; Jack H. Park

[57] ABSTRACT

Disclosed is a petroleum recovery method suitable for recovering petroleum from subterranean formations containing water having high salinity and/or divalent ion concentration, employing an aqueous surfactant-containing fluid which is designed to effect low surface tension displacement of petroleum in the formation in the presence of high salinity water. The improvement comprises injecting the total desired volume of surfactant in the form of a plurality of relatively small slugs of surfactant fluid, and alternatingly injecting similarly small pore volume slugs of fresh water having salinity less than the salinity of the formation water. The total pore volume of surfactant-containing fluid injected is ordinarily from 0.01 to 1.00 and preferably from 0.20 to 0.50 pore volumes. This total amount of surfactant fluid is injected in from 2 to 15 and preferably from 3 to 6 separate discrete slugs. Each slug of surfactant fluid is followed by injecting a quantity of low salinity, relatively fresh water, e.g. of salinity less than about 10,000 and preferably less than 1000 parts per million total dissolved solids. The volume of each lower salinity water isolating slug is less than 0.5 and preferably in the range of 0.05 to 0.20 pore volumes.

15 Claims, 2 Drawing Figures

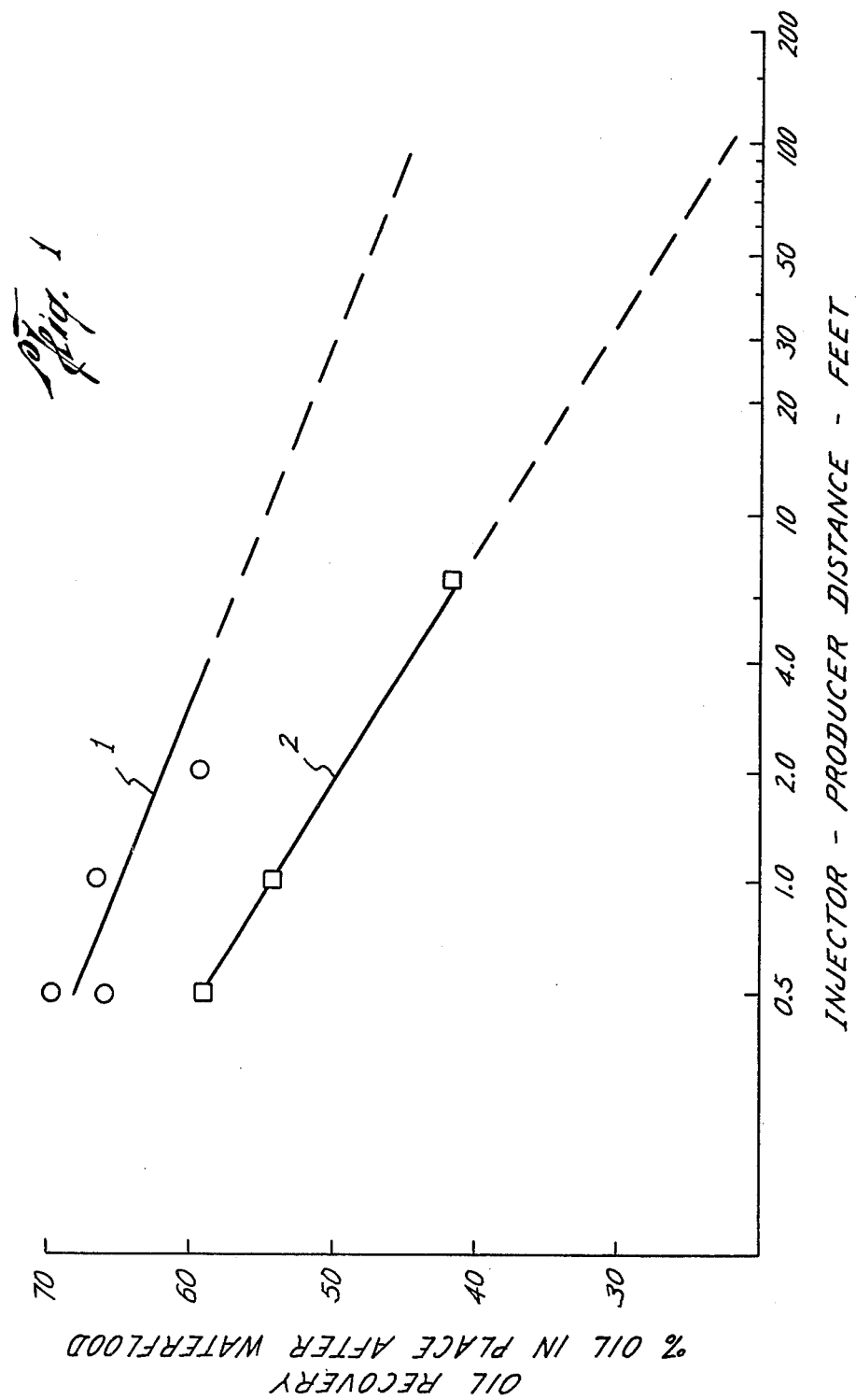

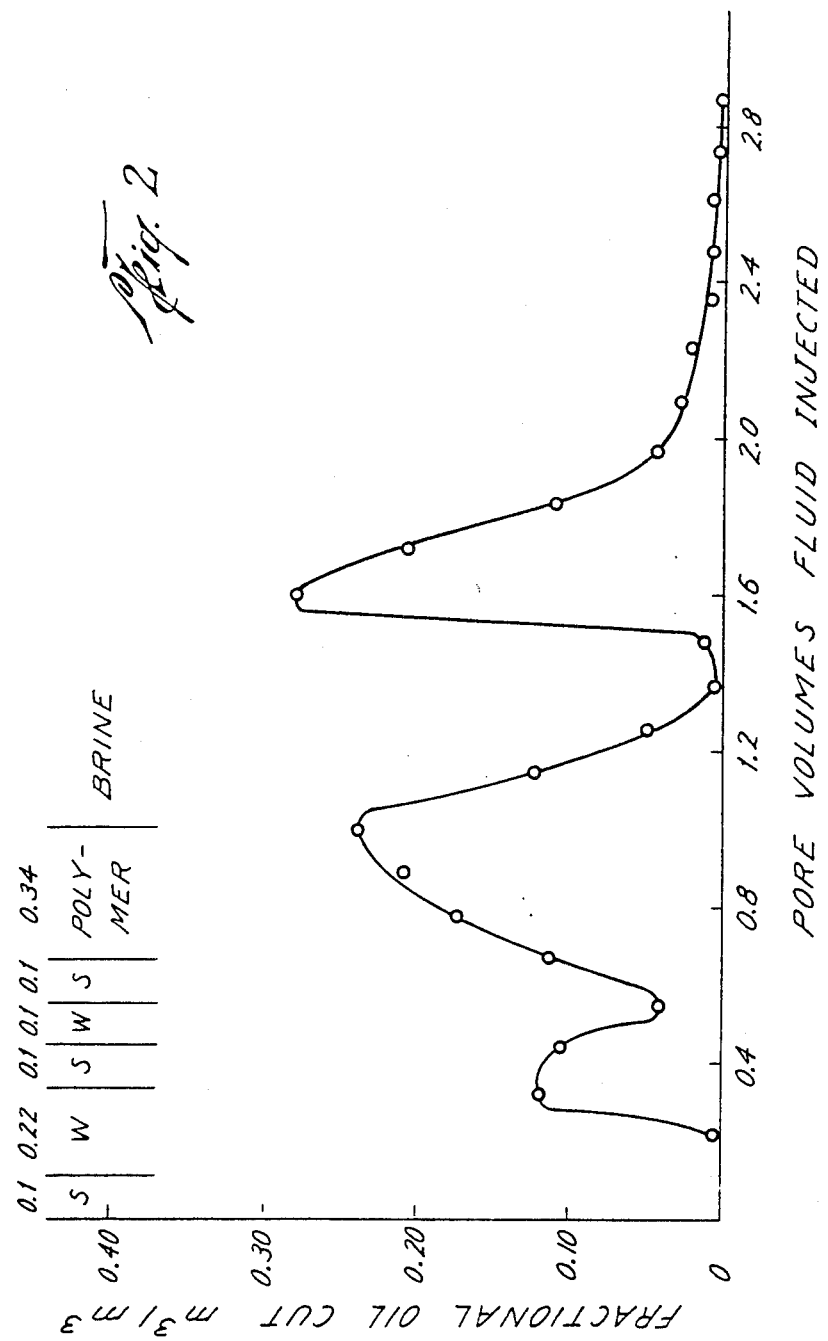

OIL RECOVERY METHOD EMPLOYING ALTERNATE SLUGS OF SURFACTANT AND FRESH WATER

CROSS REFERENCE TO RELATED APPLICATION

This is a continuation-in-part of copending application Ser. No. 193,323 filed Oct. 2, 1980, now abandoned, for "Oil Recovery Method Employing Alternate Slugs of Surfactant and Fresh Water", which was a continuation-in-part application of Ser. No. 71,211 filed Aug. 30, 1979, now abandoned for "Oil Recovery Method Employing Alternate Slugs of Surfactant and Fresh Water", now abandoned.

FIELD OF THE INVENTION

This invention concerns a surfactant waterflooding petroleum recovery process.

BACKGROUND OF THE INVENTION

Petroleum is found in subterranean formations or reservoirs in which it has accumulated, and recovery is initially accomplished by pumping or permitting the petroleum to flow to the surface of the earth through wells drilled into and in fluid communication with the subterranean reservoirs. Petroleum can be recovered from the subterranean formations only if certain conditions exist. There must be an adequately high concentration of petroleum in the formation, and there must be adequate permeability or interconnected flow channel throughout the formation to permit the flow of fluid therethrough if sufficient pressure is applied to the fluid. When the subterranean, petroleum-containing formation has natural energy present in the form of an active, underlying or edge water drive, solution gas, or a high pressure gas cap above the petroleum within the reservoir, the natural energy is utilized to recovery petroleum in what is commonly referred to as primary recovery. In this primary phase of petroleum recovery, petroleum flows to wells drilled into and completed in the formation, the petroleum being displaced through the formation toward the wells by the naturally occurring energy in the reservoir. When the natural energy source is depleted, or in the instance of those formations which do not originally contain sufficient natural energy to permit primary recovery operations, some form of supplemental recovery process must be applied to the reservoir. Supplemental recovery is frequently referred to as secondary or tertiary recovery, although in fact it may be primary, secondary or tertiary in sequence of employment. Petroleum recovery operations involving the injection of water into the formation for the purpose of displacing petroleum toward the production well, commonly referred to as waterflooding, is the most economical and widely practiced form of supplemental recovery. Water does not displace petroleum with high efficiency, however, since water and oil are immiscible and the interfacial tension between water and oil is quite high. Persons skilled in the art of oil recovery have recognized this limitation of waterflooding and many additives have been described in the literature for incorporating in the flood water for the purpose of decreasing the interfacial tension between the injection water and the formation petroleum. For example, petroleum sulfonates have been disclosed in many references for use in oil recovery operations, but petroleum sulfonates have limitations with respect to formation water salinity, hardness and other factors which frequently restrict their usefulness. U.S. Pat. No. 3,811,504 describes a three component surfactant system comprising an anionic surfactant such as an alkyl or alkylaryl sulfonate plus a nonionic surfactant such as a polyethoxylated alkylphenol plus an alkylpolyethoxy sulfate. U.S. Pat. No. 3,811,505 describes a dual surfactant system employing an anionic surfactant such as an alkyl or alkylaryl sulfonate or phosphate, plus a nonionic surfactant such as polyethoxylated alkylphenol or polyethoxylated aliphatic alcohol. These systems permit the use of a surfactant flooding process in formations containing from 500 to 12,000 parts per million polyvalent ions such as calcium and magnesium. The foregoing process employing nonionic surfactants such as ethoxylated and sulfated surfactants are effective at high salinities, but have a limited temperature tolerance range. Surfactant waterflooding processes employing alkylpolyalkoxyalkylene sulfonates or alkyarylpolyalkoxyalkylene sulfonates are described in U.S. Pat. Nos. 3,827,497; 3,890,239; and 4,018,278. These surfactants are especially suitable for use in surfactant waterflood operations being applied to formations whose temperatures exceed the useful limits of nonionic surfactants and polyethoxylated and sulfated surfactants, and are additionally effective for use in formations containing very high salinity formation water.

While the above mentioned surfactant waterflood oil recovery processes have produced various encouraging results in laboratory experiments, field application of these processes have generally been less successful than expected, and the amount of additional oil recovered has thus far been insufficient to justify the cost of the surfactant materials incorporated in the flood water. A substantial cause for the disappointing results obtained in field application of surfactant waterflood oil recovery processes described in the literature are believed to be the loss of surfactant from the aqueous surfactant fluid to the formation as the fluid passes through the flow channels of the formation. This loss of surfactant is at least in part related to the adsorption of the surface active agents from the aqueous fluid onto the mineral surface of the formation matrix. It is also believed that some loss of surfactant to the formation occurs as a consequence of surfactant fluid entering dead-end flow channels of the formation, and remaining trapped in those flow channels and unavailable for subsequent low surface tension displacement of petroleum as the fluids are displaced through the formation by the drive water.

The use of many additives has been described in the literature for the purpose of decreasing the amount of surfactant adsorbed by the formation, including water soluble salts of carbonates, phosphates, fluorides, as well as quaternary ammonium salts. Unfortunately, many of the most effective sacrificial agents cannot be employed in processes being applied to formations containing relatively high concentrations of divalent ions such as calcium and magnesium because of the precipitation of insoluble calcium or magnesium salts which occurs when the injected chemicals contact the hard formation water. In formations containing high concentrations of divalent ions, water soluble lignosulfonate salts and related compounds can be used to reduce adsorption of surfactant, but they are expensive and not entirely satisfactory for preventing loss of surfactant in the formation from the surfactant-containing fluid.

In view of the foregoing discussion, it can be appreciated that there is a significant unsatisfied commercial need for a surfactant waterflooding oil recovery method, especially one employing the synthetic surfactants which can be used in formations containing high salinity, hard water, without experiencing significant loss of surfactant from the surfactant-containing fluid to the formation mineral matrix. More particularly, there is a significant commercial need for a method of conducting a surfactant waterflooding oil recovery process in which the amount of additional oil recovered as a consequence of injecting the surfactant-containing fluid, is sufficient to justify the high cost of the surfactant waterflooding oil recovery process.

BRIEF DESCRIPTION OF THE PRIOR ART

U.S. Pat. No. 3,882,940 describes a tertiary oil recovery process in which a surfactant-containing oil recovery fluid is followed by alternating cycles of injecting slugs of gas and slugs of water.

U.S. Pat. No. 3,421,582 describes a surfactant waterflooding process employing two surfactant-containing slugs with an aqueous drive fluid injected intermediate between the two slugs.

SUMMARY OF THE INVENTION

The present invention concerns a surfactant waterflooding oil recovery process, especially one employing a surfactant tolerant of relatively high concentrations of salinity and/or divalent ions in the formation water. Surfactants of the class suitable for use in this process include nonionic surfactants, alkylpolyethoxy sulfates or alkylarylpolyethoxy sulfates, and alkylpolyalkoxyalkylene sulfonates or alkylarylpolyalkoxyalkylene sulfonates.

In applying the particular process of this invention, the total amount of surfactant-containing fluid to be injected into the formation is injected in the form of a plurality of separate, discrete slugs of surfactant fluid, alternatingly injecting similarly small slugs of water containing essentially no surfactant, the salinity of these isolation water slugs being substantially less than the salinity of the water in the formation and less than the salinity of the water in the surfactant slug. The salinity of the isolation water slugs is no greater than 10,000 and preferably no greater than 1000 parts per million total dissolved solids. Ordinarily from 2 to 15 and preferably from 3 to 6 separate slugs of surfactant are injected into the formation, the total volume of surfactant being from 0.01 to 1.00 and preferably from 0.20 to 0.50 pore volumes based on the pore volume of formation to be affected by the injected fluid. The number of slugs of fresh water injected alternatingly with the slugs of surfactant fluid will ordinarily be about the same as the number of surfactant slugs. The volume of each slug of fresh water is very critical to the proper function of this invention. Each fresh water isolation slug must be less than 0.5 pore volumes, and is preferably 0.05 to 0.20 pore volumes. Subject to the above limitation, the fresh water slug volume may be from 0.5 to 2 times the volume of the immediately preceding surfactant slug.

After all of the slugs of surfactant fluid and slugs of low salinity water are all injected into the formation, a quantity of water containing a viscosifying amount of a hydrophilic polymer or other material capable of increasing the viscosity of the fluid is injected immediately after the surfactant fluid to achieve a favorable mobility ratio which insures more efficient displacement of the surfactant fluid. This in turn is followed by injecting a quantity of drive water or brine sufficient to displace all of the injected fluids through the formation.

BRIEF DESCRIPTION OF THE DRAWINGS

FIG. 1 illustrates the oil recovery effectiveness in curve 2 of a surfactant waterflooding oil recovery process practiced according to the teachings of the prior art, in which a single slug of surfactant fluid is injected into the formation and followed by a slug of mobility controlling, viscous fluid and finally followed by drive water. the oil recovery is shown as a function of the length of cores in which the laboratory experiments are performed, with an extrapolation on the semi log plot to illustrate how the oil recovery effectiveness is decreased with increased distance between the injection and production point in laboratory tests. Curve 1 illustrates an otherwise similar surfactant waterflood process, except it is conducted in accordance with the present invention, by injecting the same total pore volume of surfactant in the form of a plurality of small slugs separated by slugs of fresh water.

FIG. 2 illustrates a typical result of application of the process of this invention, showing how the injection of three discrete slugs of surfactant fluid each separated by slugs of fresh water within the critical pore volume range of my invention gives rise to variations in the oil cut of the produced fluid, taking the form of three waves or banks of oil in the fluid being produced from the formation.

DETAILED DESCRIPTION OF THE INVENTION

Surfactant waterflooding enhanced oil recovery processes as have been described in many prior art references, generally involve injecting a single quantity of surfactant fluid into the formation. Whatever surfactant is utilized, this fluid is followed by injecting water or preferably an aqueous mobility controlling fluid comprising water having dissolved therein an effective amount of viscosity-increasing material such as a hydrophilic polymer, in order to insure favorable mobility ratio between the surfactant and subsequently-injected fluids necessary to achieve efficient sweep of the portion of the formation between the injection and production wells. As the injected surfactant-containing fluid passes through the flow channels of the formation, it displaces oil which is not displaced by waterflooding because of the presence of the interfacial tension-reducing chemical in the fluid. Unfortunately, the surfactant fluid remains in the formation for very long periods of time, and retention of surfactant by the formation mineral matrix is a problem which apparently affects virtually all surfactant waterflooding oil recovery processes. Moreover, the processes designed for use in formations containing water whose salinity exceeds about 20,000 parts per million total dissolved solids employ relatively expensive synthetic surfactants which are effective for low surface tension oil recovery purposes at the salinity of the formation water, and these surfactants are adsorbed even more readily from the high salinity surfactant-containing fluid than are the simple organic sulfonates used in formations containing low salinity water.

I have discovered that surfactant losses can be reduced significantly in surfactant waterflooding processes being applied to formations containing water whose salinity exceeds 20,000 parts per million total dissolved solids if the surfactant is injected in the form of a plurality of relatively small slugs of surfactant fluid, with a similarly small slug of fluid consisting essentially of fresh water injected between succeeding slugs of surfactant fluid. The amount of oil recovered from a portion of formation contacted by a surfactant fluid is increased significantly by following the process of my invention, as compared to a conventional surfactant waterflood oil recovery process employing essentially the same surfactant in the same concentration and using the same total amount of the surfactant fluid, except that the surfactant fluid is injected in the form of a single, large slug of surfactant fluid rather than the plurality of small slugs with alternating injection of fresh water according to my process.

It is believed that there are two possible mechanisms, one or both of which may be responsible for the favorable results obtained by application of the process of my invention. One is based on the significantly lower ionic forces at the lower salinity water and lower divalent ions between the entrapped oil droplets and its environment, such as the matrix and fluids. By cyclically reducing the ionic forces within the flow channels, oil-water emulsions become free to move under the influence of injected fluids, and also some of the surfactant becomes available for subsequent use downstream from the injection well. The second possible explanation for the improvement relates to the resolubilization of surfactant which has been entrapped or adsorped, either chemically or chemisorbed, because of the lower ionic forces at the lower water salinity and low divalent ion concentration present in the portion of the formation each time it is contacted by the low salinity fluid being injected sequentially between slugs of saline surfactant fluid. It is entirely possible that either of these mechanisms, or both simultaneously, operate to affect the observed increase in tertiary oil recovery by application of this process. It is in connection with resolubilization of surfactant that the criticality of the volume of the low salinity isolation slug can be appreciated. It is desired to resolubilize the surfactant and maintain the surfactant concentration at an effective level. If the volume of fresh water exceeds the upper limit mentioned above, even with previously adsorbed surfactant dissolved in the leading edge of the fresh water slug, the surfactant concentration in the trailing edge of the slug will be too low to be effective. This large fresh water slug causes dispersion of surfactant into a fluid whose surfactant concentration is too low to be effective. The use of fresh water slug of excessive volume reduces oil recovery efficiency and wastes surfactant.

In applying the process of my invention, the total volume of surfactant fluid to be used will ordinarily be from 0.01 to 1.0 and preferably from about 0.20 to 0.50 pore volumes based on the pore volume of portion of the formation to be contacted by the injected fluid. The number of slugs of surfactant used is from 2 to 15 and preferably from 3 to 6. The volume of each slug should be at least 5 percent and preferably at least 10 percent of the total volume of surfactant fluid used. The pore volume of each surfactant slug will be from 0.01 to 0.50 pore volumes and preferably from 0.05 to 0.2. The volume of each fresh water slug will be less than 0.5 and preferably from 0.05 to 0.2 pore volumes. So long as each isolation slug is within the above range of pore volumes, it may be from 0.5 to 2 times the pore volume of the surfactant fluid slug injected immediately before it. As used throughout this application, pore volumes is based on the pore volume of the formation within the recovery zone defined by the injection and production wells.

If this process is to be applied to a formation containing relatively high salinity formation water, and/or water containing relatively high concentrations of divalent ions, the surfactant fluid will ordinarily contain one or more of the following surfactants.

(1) In application to formations whose temperature is less than about 125° F., nonionic surfactants may be employed advantageously and they are somewhat less expensive than the more complex surfactants to be described below. Examples of suitable nonionic surfactants for use in this embodiment of the process of my invention are listed below.

(a) polyethoxylated alkanols or alkylphenols having the following formula:

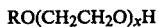

RO(CH$_2$CH$_2$O)$_x$H wherein R is an alkyl group having from 5 to 20 and preferably from 8 to 16 carbon atoms, or an alkylaryl such as a benzene or toluene having attached thereto at least one alkyl chain, linear or branched, containing from 5 to 18 and preferably from 6 to 14 carbon atoms, and x is from 4 to 20 and preferably 6 to 16.

(b) Dipolyethoxylated amines having the following formula:

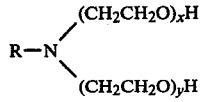

wherein R is an alkyl, linear or branched containing from 6 to 25 and preferably from 8 to 20 carbon atoms, N is nitrogen or an alkylaryl such as benzene, toluene or xylene having attached thereto at least one alkyl group containing from 6 to 25 and preferably 8 to 20 carbon atoms, x and y are each 1 to 12 and the sum of x and y is from 2 to 24.

(c) A dipolyethoxylated alkyl catacol having the following formula:

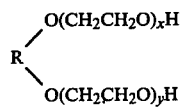

wherein R is benzene or alkylaryl, such as benzene having attached thereto a linear or branched alkyl having from 6 to 25 and preferably 8 to 20 carbon atoms, x and y are each 1 to 12 and the sum of x and y is from 2 to 24.

(2) Another class of surfactants are suitable for use in formations whose temperature is no greater than about 160° F., but which can be utilized in formations containing relatively high salinity water, i.e., water whose salinity is as high as 240,000 parts per million total dissolved solids. This group includes an alkylpolyethoxy sulfate or alkylarylpolyethoxy sulfate having the following formula:

RO(CH$_2$CH$_2$O)$_x$SO$_3$M wherein R is an alkyl or alkylaryl having from 6 to 24 and preferably from 8 to 18 carbon atoms in the alkyl chain, x is a number from 2 to 18 and preferably from 2 to 8, and M is a monovalent cation including sodium, potassium, lithium, or ammonium. The foregoing polyethoxy sulfate surfactant is quite effective in high salinity formations including hard brine formations, e.g. formations containing water whose salinity is as high as 240,000 parts per million total dissolved solids which may include as high as 10,000 parts per million divalent ions such as calcium and magnesium; however, this surfactant is prone to hydrolysis at elevated temperatures and so should not be used if the formation's temperature exceeds about 160° F.

(3) An especially preferred surfactant for high temperature, high salinity formations, is an alkylpolyalkoxyalkylene sulfonate or alkylarylpolyalkoxyalkylene sulfonate having the following formula:

$$RO(R'O)_xR''SO_3M$$

wherein R is an alkyl, linear or branched, having from 6 to 24 and preferably from 12 to 20 carbon atoms, or an alkylaryl such as benzene or toluene having attached thereto at least one alkyl group, linear or branched, and containing from 6 to 20 and preferably 6 to 16 carbon atoms, R' is ethylene or a mixture of ethylene and higher alkylene such as propylene with relatively more ethylene than higher alkylene, x is a number including fractional numbers from 2 to 18 and preferably from 2 to 8, R" is ethylene, propylene, hydroxypropylene or butylene, and M is a monovalent ion, preferably sodium, potassium, lithium or ammonium.

Any of the foregoing surfactants may be employed as substantially the only surfactant present in the surfactant fluid used in the process of this invention, or may be used in combination with other surfactants. For example, the use of primary anionic surfactants, usually organic sulfonates such as petroleum sulfonates, alkyl sulfonates or alkylaryl sulfonates in combination with any of the above described more soluble synthetic surfactants, is a cost effective method for conducting surfactant waterflooding operations in a high salinity formation. Organic sulfonates are particularly effective and the preferred organic sulfonates for use in the process of this invention are those which are at least partially water soluble, preferably being comprised of species of varying equivalent weight over a relatively broad range and having an average equivalent weight in the range of about 350 to about 450. Alkyl or alkylaryl sulfonates having from 6 to 20 and preferably from 8 to 18 carbon atoms in the alkyl chains may also be employed. Ordinarily the water soluble sodium, potassium, lithium or ammonium salt of the above described organic sulfonate are utilized.

The concentration of the synthetic surfactants described above will ordinarily be in the range of from about 0.10 to 10.0 and preferably from about 0.5 to 3.0 percent by weight. In the instance of using a combination of surfactants such as is described in the last paragraph, the concentration of the primary anionic organic sulfonate surfactant will be from 0.1 to 10.0 and preferably from 1.0 to 5.0 percent by weight. It is customary to maintain the ratio of primary anionic organic sulfonate surfactant to the solublizing surfactant in the range of 0.1 to 10.0 and preferably from 0.2 to 3.0.

The total pore volume of surfactant solution employed in the process of this invention is approximately the same as is used in conventional processes described in the literature and are generally in the range of from 0.1 to 1.0 and preferably from 0.20 to 0.50 pore volumes. Similarly, it is customary in state-of-the-art surfactant waterflooding processes to follow the surfactant solution with a mobility-controlling fluid comprising water having dispersed or dissolved therein a sufficient amount of a viscosifying material to increase the viscosity of the fluid so as to insure a favorable mobility ratio between that fluid and the previously-injected surfactant fluid. Ordinarily from about 100 to about 2,000 and preferably from about 500 to 1500 parts per million hydrophilic polymers such as partially hydrolyzed polyacrylamides, copolymers of acrylamide and acrylic acid, as well as biopolymers such as polysaccharides which are commercially available for this purpose, achieve the desired favorable mobility ratio between the mobility fluid and the previously injected surfactant fluid. From 0.1 to 1.0 and preferably 0.20 to 0.50 pore volumes of mobility-controlling fluid is ordinarily employed and should be employed in a preferred embodiment of this process. The mobility-controlling fluid is injected immediately after all of the slugs of surfactant and fresh water have been injected. Field brine is injected next to displace mobilized oil and the previously injected fluids through the formation.

In applying the process of this invention, the total quantity of surfactant fluid is not injected into the formation in a single, large slug as is common practice in surfactant waterflooding operations described in the literature pertaining to surfactant waterflooding. Rather, the surfactant fluid is injected in relatively small slugs, separating the slugs of surfactant fluid by injecting small slugs of fresh water containing little or no surfactant, said fresh water slugs having salinities no greater than 10,000 and preferably no greater than 1000 parts per million, which is substantially less than the salinity of the formation water or the surfactant fluid.

In applying this process to high salinity formations, where surfactant loss is especially acute and where this process is particularly effective, the particular surfactants will be tailored and if a blend of surfactants is employed, the blend will be balanced so the surfactant is slightly soluble in water having a salinity about equal to the formation water, and additionally so the surfactant reduces the interfacial tension between the formation petroleum and the formation brine to a value less than about 100 and preferably less than about 10 millidynes per centimeter. Once the preferred surfactant species and/or blend is identified, it will be dispersed and/or dissolved in an aqueous fluid having a salinity which is from 50 to 100 and preferably from 80 to 100 percent of the salinity of the formation water.

The salinity of the water employed as the isolation slugs injected sequentially with the slugs of saline surfactant fluid should be no greater than about 10,000 parts per million total dissolved solids and preferably no greater than 1000 parts per million total dissolved solids, in order to achieve a maximum recapture of surfactant absorbed by the formation matrix and/or contained in stagnant or dead end pores.

The pore volumes of low salinity water employed sequentially with the separate slugs of surfactant fluid is very critical to the proper function of my invention. The pore volume of each low salinity water slug must be less than 0.5 pore volumes and is preferably in the range of 0.05 to 0.20 pore volumes. So long as the pore volume does not exceed 0.5 pore volumes, the volume of each fresh water slug should be from 0.5 to 2.0 times the pore volume of the slug of surfactant fluid injected immediately therebefore.

A convenient and preferred method of operating according to the process of this invention comprises injecting slugs of surfactant fluid which are about equal to one another, although this is not necessary, and it is sometimes desirable in certain applications to taper or vary the pore volume of succeeding slugs of surfactant fluid during the course of injecting all of the surfactant fluid into the formation.

FIELD EXAMPLE

For the purpose of illustrating a preferred mode of operating according to the process of this invention, the following pilot field example is offered. This is not intended to be in any way limitative or restrictive of the scope of this invention, however; rather it is offered only for the purpose of providing a complete disclosure including best modes of operating according to this process.

A subterranean, petroleum-containing formation having a porosity of 25 percent and a permeability of 500 millidarcies, has been exploited by primary production and secondary recovery, i.e., conventional waterflooding. At the conclusion of the waterflooding phase, the oil saturation remaining in the formation is about 35 percent and the total amount of oil originally in place in the formation which has been recovered is about 45 percent. The salinity of the water present in the formation at the time waterflooding operations must be terminated is about 100,000 parts per million total dissolved solids including 10,000 parts per million divalent ions, which are principally calcium plus small amounts of magnesium. The temperature is about 180° F. (82° C.). Because of the high salinity and high temperature of this formation, the preferred surfactant is identified as a sodium nonylbenzenetriethoxypropylene sulfonate. The surfactant is quite effective when used as the only surfactant present in a fluid having a salinity of about 90,000 parts per million total dissolved solids, and an optimum concentration is identified as about 1.6 percent by weight (16 kilograms/meter$^3$).

The formation has been exploited by means of a plurality of five-spot patterns but only one unit is employed in this pilot example. The producing wells are located at the corners of a square and are approximately 100 feet apart, with the injection well in the center of the pattern. The formation thickness is approximately 42 feet and it is known that the volumetric efficiency of this pattern in a fluid displacement process is approximately 70 percent. Accordingly, the pore volume for this pattern which will be affected by injected fluids in the central injection well will be approximately $$100 \times 100 \times 42 \times 0.25 \times 0.7 = 73,500 \text{ cubic feet.}$$

One pore volume is approximately 550,000 gallons. A total of 30 percent pore volume of surfactant, or 165,000 gallons, is employed in this pilot example.

In order to achieve the maximum benefit of the process of this invention, it is decided that the above described quantity of surfactant fluid will be injected into the formation in five approximately equal slugs, each comprising 33,000 gallons of surfactant fluid. Thus the surfactant injection sequence will involve injecting 33,000 gallons of surfactant fluid containing 1.6 percent by weight of the above described surfactant, the salinity of the fluid being about 90,000 parts per million total dissolved solids, followed by injection of about 33,000 gallons (0.06 pore volume) of water whose salinity is about 1,000 parts per million total dissolved solids, followed by another 33,000 gallon slug of surfactant etc., until the entire 165,000 gallons of surfactant fluid has been injected. After the last slug of the surfactant fluid and last slug of fresh water is injected, a mobility buffer fluid is injected as is commonly practiced in the art. This fluid comprises approximately 200,000 gallons of water whose salinity is about 900 parts per million total dissolved solids, containing about 1100 parts per million of a partially hydrolyzed acrylamide hydrophilic polymer. After the last of the polymer fluid is injected, field brine containing 100,000 parts per million total dissolved solids is injected to displace all of the previously-injected fluids through the formation, with petroleum being recovered from the production wells until the fluid being recovered at those wells rises to a water cut in excess of 98 percent, indicating that all of the oil that can be recovered economically by tertiary means has been recovered from the formation.

EXPERIMENTAL SECTION

For the purpose of further illustrating and disclosing the novel process of this invention, and further to illustrate how the invention can be applied to particular environments and to illustrate the magnitude of results achieved from application thereof, the following described laboratory work was performed and the observed results are described below.

A series of surfactant floods were performed on three Berea formation cores of varying lengths (from 6 inches to 6 feet) using a single surfactant-containing aqueous fluid. In all of the tests, the surfactant employed was a sodium dodecylbenzenepolyethoxyethylene sulfonate containing an average of 4.25 moles of ethylene oxide per mole of surfactant. The concentration of surfactant in all of the tests was 1.5 percent by weight (15 kilograms/meter$^3$). The salinity of the surfactant fluid was approximately 90,000 parts per million total dissolved solids. These tests were conducted in connection with a study of a possible field candidate for surfactant flooding containing water whose salinity was in the range of from 85,000 to 100,000 parts per million (85 to 100 kilograms/meter$^3$) total dissolved solids.

In all of the laboratory experiments described below, the cores were mounted in conventional laboratory flooding equipment, saturated with brine, then oil saturated, and next waterflooded to an oil saturation value approximating that existing at the conclusion of waterflooding in an oil formation. The surfactant fluid was then injected into the cores, followed by injecting a mobility-controlling fluid comprising 1000 parts per million of a polysaccharide in water, and displaced by field brine having a salinity in the range of 85 to 100,000 parts per million total dissolved solids, until the water cut of the fluid being recovered from the core had risen to a value signifying completion of the test.

In each of the first series of experiments, a single 0.33 pore volume slug of the above described saline surfactant-containing aqueous fluid was injected into the core as described above, followed by 0.33 pore volume slug of polymer, and completed by injecting brine. The three tests were conducted in cores whose lengths were 6 inches, 1 foot and 6 feet. Curve 2 of attached FIG. 1 illustrates that the tertiary oil recovery in the short, 6-inch core was in the range of about 59 percent of the oil in place after water flooding the core, but decreased to about 54 percent in the 1-foot core and to about 42 percent in the 6-foot core. This clearly indicates that the surfactant fluid is effective for displacing oil from the pore channels of the formation in significant quantities above that obtainable by waterflooding, but also shows the severity of the problem associated with loss of surfactant from the aqueous surfactant fluid to the formation material of which the core is composed. The rate of decline of tertiary oil recovery with increasing distance between injection and production point suggests that the process will be ineffective for recovering significant amounts of oil in application to formations in which the distance between the injection point and production point is significantly greater than the length of the longer core employed in these tests. For example, if the oil recovery vs. distance between injector and producer can validly be extrapolated, it can be seen from curve 2 of FIG. 1 that the oil recovery will decrease to about 22 percent if the injector producer distance is about 100 feet. This is clearly unsatisfactory and would not result in an economically viable surfactant waterflooding oil recovery process.

Another series of experiments were conducted in essentially the same manner as that described above, using three Berea cores of different lengths and the same surfactant fluids. The difference between the second series of experiments and those described in detail above, was that the same total amount of surfactant fluid was divided into a series of small slugs and injected sequentially into the formation. Fresh water slugs (of no more than 100 parts per million total dissolved solids salinity) were injected between successive slugs of surfactant fluid. The exact sequence of slugs injected was as follows:

(1) 0.11 pore volume surfactant fluid;
(2) 0.22 pore volume fresh water;
(3) 0.11 pore volume surfactant fluid;
(4) 0.11 pore volume of fresh water;
(5) 0.11 pore volume of surfactant fluid;
(6) 0.33 pore volume of fresh water containing 1000 ppm Xanflood ® polymer followed by 1.8 pore volumes of brine. The same total volume of surfactant fluid and the same surfactant concentration was employed in both the first and second sets of experiments, the only difference being the fact that the second set of tests were conducted according to the process disclosed herein, by sequentially injecting small slugs of surfactant fluid and slugs of fresh water. Identical tests were run in cores of length 6 inches, 1 foot, and 2 feet. The results are shown graphically in curve 1 of FIG. 1, and it can be seen that under the conditions in the laboratory test, significantly more oil was recovered using the process of this invention than was accomplished using an otherwise identical chemical waterflooding process employing a single large slug of surfactant. More surprisingly, the rate of decline of oil recovery was less as distance between the point of injection and production is increased in applying the process of this invention, than was the case in the single surfactant slug technique illustrated in curve 2. It can be seen that the oil recovery under laboratory conditions was in the range of from about 70 to about 59 percent of the oil in place, at the core lengths employed in these tests. If this decline curve can be validly extrapolated to distances having field significance, it can be seen that at about 100 feet separation between injector and producer, the oil recovery will be in the range of about 44 percent, as compared to about 22 percent at the same distance from the extrapolation of curve 2. This means that twice as much tertiary oil will be recovered using the process of my invention over a conventional surfactant waterflood oil recovery method, without employing any other chemicals or any greater quantities of surfactant or polymer.

The foregoing clearly illustrates how significantly more oil can be recovered using a plurality of slugs of surfactant fluid separated by slugs of lower salinity or fresh water containing no surfactant. As discussed earlier herein, it is believed that one or both of the mechanisms discussed earlier may be responsible for this improvement. In any event, it is clearly evident that significantly more oil can be recovered by surfactant waterflooding according to the process of this invention than when a single large slug of surfactant fluid is injected into the formation as is commonly taught in prior art references dealing with tertiary recovery.

FIG. 2 illustrates an experiment in which the process of this invention was applied to a 12-inch Berea core. The surfactant fluid was an aqueous fluid containing 1.5 percent by weight of dodecylbenzenepolyethoxyethylene sulfonate containing 4.25 moles of ethylene oxide per mole of surfactant. The salinity of the surfactant fluid was about 90,000 parts per million total dissolved solids. A total of 0.33 pore volumes of surfactant fluid was injected in three separate slugs. The first was approximately 0.11 pore volumes and this was followed by a 0.22 pore volume slug of fresh water containing about 100 parts per million total dissolved solids, and containing no surfactant. This was followed by another 0.11 pore voume slug of surfactant, followed by a second, smaller slug of water, being only about 0.11 pore Volume. This was followed by the third 0.11 pore volume of surfactant. After injection of the third surfactant slug, approximately 0.33 pore volumes of an aqueous solution having a salinity of no more than 100 parts per million total dissolved solids and containing 1000 parts per million Kelzan MF ® (now called Xanflood ®) biopolymer for mobility control was injected. Brine was injected next to the completion of the test. The data of FIG. 2 illustrates the fractional oil content or oil cut of the fluid recovered from the core on a continuing basis during the course of this experiment. Oil cut is numerically equal to (1- water cut) which is normally monitored during waterflood operations. It can be seen that three distinct banks of oil were produced from this core, which is not observed when a single slug of surfactant is injected into a core for surfactant waterflooding experiments following the teachings in the literature dealing with surfactant waterflooding. The final tertiary recovery in this experiment was 66.8 percent and the residual oil saturation at the conclusion of this experiment was 11.3 percent. This is considered to be an excellent result, and illustrates further the magnitude of oil recovery which can be achieved when following the process of this invention.

A final series of tests were performed to show precisely the degree of improvement attained in applying the process of my invention and the criticality of isolation slug pore volume size. A series of four experiments were performed using surfactant fluid to displace oil from Berea cores, each of which was 12 inches (30.1 cm) long and 2 inches (5.1 cm) in diameter. The pore volume of the cores ranged from about 128 to 133 milliliters. Permeabilities of the cores ranged from 326 to 378 millidarcies.

Each core was cleaned and saturated with Bob Slaughter Block (BSB) brine whose salinity was about 90,000 parts per million total dissolved solids, after which an initial oil saturation was established with crude oil obtained from the Slaughter field in West Texas. The cores were then waterflooded with BSB brine to establish a residual oil saturation (which ranged from 37.9 to 33.8 percent) after waterflooding, which is the proper initial core condition for a surfactant waterflood.

The surfactant fluid employed in each test was 90,000 ppm salinity BSB brine containing 1.5 percent (15 Kg/m$^3$) weight of dodecylbenzenetetraethoxyethylene sulfonate. In each test, the total volume of surfactant fluid was ⅓ pore volume.

One third pore volume of a viscous fluid mobility-controlling slug comprising 1000 parts per million of Xanflood ® biopolymer dissolved in fresh water (less than 1000 ppm total dissolved solids) was injected after injection of the total desired amount of surfactant fluid had been injected, after which from 1.4 to 2.1 pore volumes of BSB brine was injected as a drive fluid.

The data are given in the table below.

TABLE I

| RUN | FLUID SLUG INJECTION SEQUENCE | $E_R$ PERCENT OIL RECOVERED BY SURFACTANT WATERFLOODING |
|---|---|---|
| A | (1) ⅓ Vp surfactant fluid<br>(2) ⅓ Vp polymer fluid<br>(3) 2.15 Vp brine | 21.6 |
| B | (1) 1/6 Vp surfactant fluid<br>(2) 1/6 Vp fresh water<br>(3) 1/6 Vp surfactant fluid<br>(4) ⅓ Vp polymer fluid<br>(5) 1.5 Vp brine | 31.0 |
| C | (1) 1/6 Vp surfactant fluid<br>(2) ½ Vp fresh water<br>(3) 1/6 Vp surfactant fluid<br>(4) ⅓ Vp polymer fluid<br>(5) 1.4 Vp brine | 20.4 |
| D | (1) 1/6 Vp surfactant fluid<br>(2) 1.56 Vp fresh water<br>(3) 1/6 Vp surfactant fluid<br>(4) ⅓ Vp polymer fluid<br>(5) 1.4 Vp brine | 20.3 |

Run A is an example of a typical prior art surfactant flood in which a single ⅓ pore volume slug of surfactant fluid is followed by a ⅓ pore volume slug of polymer fluid which was then followed by water drive. This flood accomplished recovery of 21.6 percent of the oil remaining in the core at the end of the preceeding waterflood.

Run B illustrates the results obtained from an optimum embodiment of my invention. The same total volume (⅓ Vp) of surfactant fluid was used, but this volume was broken into two equal volumes (1/6 Vp each) and a 1/6 Vp slug of fresh water was injected between the slugs of surfactant. This run recovered 31 percent of the oil remaining in the core at the beginning of the surfactant flood (end of waterflood), which is a 43.5% increase in tertiary oil recovery over run A even though exactly the same amount of the same chemicals were used as compared to run A.

Run C was identical to run B except the volume of the fresh water isolation slug was increased from 1/6 Vp to ½ Vp. It can be seen that this increase in volume of the isolation slug caused the tertiary oil recovery to fall from 31.0% to 20.4%, no better than the base run A.

Run D was also like run B except that the volume of the fresh water slug was increased even more, to 1.56 Vp. It can be seen that the tertiary oil recovery was almost identical to that obtained in run C and no better than base run A.

The above tests clearly show the extreme criticality in the pore volume of the fresh water slug employed between slugs of surfactant fluid slugs. Once the volume of fresh water is sufficiently great that the concentration of surfactant redissolved in the isolation slug drops below the effective concentration for the surfactant being employed, the benefit of my invention is entirely lost. Only when the fresh water isolation slug volume is carefully controlled is the significantly greater tertiary oil recovery reported above realized.

I have found that if a single, large slug of surfactant and polymer are followed by a single, large slug of fresh water equivalent in volume to the plurality of small slugs of fresh water, an increase in tertiary oil recovery is noted. The magnitude of the increase is less than that observed using plurality of slugs according to my invention, however. Also, the final oil recovery (at maximum water cut) is only achieved after injecting greater total quantities of liquid, which means the economic end of an enhanced oil recovery process will come at a much later time using a single terminal fresh water slug than in applying my invention. In a commercial field application, the difference in time to reach the economic cut-off point may be in the range of several years, which makes my process much more economical. It must also be understood that if the surfactant fluid and fresh water are mixed on the surface and injected as a large, single slug, the oil recovery effectiveness will be greatly reduced, since the fluid salinity and surfactant concentration would both be reduced below the optimum level.

While the foregoing disclosure of the process of this invention has been described in a number of specific illustrative embodiments, this is not in any way limitative or restrictive of the true scope of this invention. Furthermore, while explanations have been offered for the improvements observed in applying this process, it is not necessarily represented that these are the only or even the primary mechanisms responsible for the improvements achieved. It is my intention that my invention be limited and restricted only by those limitations and restrictions appearing in the claims appended immediately hereinafter below.

I claim:

1. A method of recovering petroleum from a subterranean, petroleum-containing, permeable formation penetrated by at least one injection well and by at least one production well, said formation containing water having a salinity in excess of about 20,000 parts per million total dissolved solids, comprising injecting into the formation a predetermined volume of an aqueous surfactant fluid, said surfactant being slightly soluble in a fluid having a salinity of from 50 to 100 percent of the salinity of the water present in the formation, and reducing interfacial tension between the petroleum and water to a value less than 100 millidynes/centimeter, said surfactant fluid being injected by the injection well and displacing petroleum in the formation toward the production from which it is recovered to the surface of the earth, wherein the improvement comprises:

injecting the surfactant fluid into the formation in from 2 to 15 separate slugs, and separating successive slugs of surfactant fluid from one another by injecting sequentially therewith, separate isolation slugs consisting essentially of fresh water having salinity less than 10,000 parts per million total dissolved solids, the volume of each isolation slug being less than 0.5 pore volume.

2. A method as recited in claim 1 wherein the number of surfactant slugs is from 3 to 6.

3. A method as recited in claim 1 wherein the volume of each surfactant slug is at least 5 percent of the total volume of surfactant fluid.

4. A method as recited in claim 3 wherein the volume of each surfactant slug is at least 10 percent of the total volume of surfactant fluid.

5. A method as recited in claim 1 wherein the salinity of the fresh water isolation slugs is less than 1000 parts per million total dissolved solids.

6. A method as recited in claim 1 wherein the pore volume of each fresh water isolation slug is from 0.05 to 0.20 pore volume.

7. A method as recited in claim 6 wherein the volume of each fresh water isolation slug is from 0.5 to 2.0 times the volume of the preceeding surfactant slug.

8. A method of recovering petroleum from a subterranean petroleum-containing, permeable formation penetrated by at least one injection well and by at least one production on well, each well being in fluid communication with at least a portion of the formation, said formation containing water of known or determinable salinity in the range of from 20,000 to 240,000 parts per million total dissolved solids, comprising (a) injecting from 0.01 to 0.50 pore volumes of an aqueous saline, surfactant-containing fluid into the formation via the injection well, said fluid containing from 0.1 to 10.0 percent by weight of a surfactant which is slightly soluble in said fluid and which reduces the interfacial tension between formation petroleum and said fluid to a value less than 100 millidynes per centimeter, (b) injecting an isolation slug consisting essentially of fresh water having a salinity which is no greater than 10,000 parts per million total dissolved solids into the formation to displace the surfactant fluid away from the injection well, the pore volume being less than 0.5;

(c) repeating steps (a) and (b) at least once;

(d) recovering petroleum displaced by the previously injected fluids from the formation via the production well.

9. A method as recited in claim 8 wherein the volume of surfactant fluid is from 0.05 to 0.20 pore volumes.

10. A method as recited in claim 8 wherein the volume of water is from 0.05 to 0.2 pore volumes.

11. A method as recited in claim 8 wherein the total number of slugs of surfactant fluid injected is from 2 to 15.

12. A method as recited in claim 8 wherein the total number of surfactant slugs injected is from 3 to 6.

13. A method as recited in claim 8 wherein the salinity of the isolation slug is no more than 1,000 parts per million total dissolved solids.

14. A method as recited in claim 8 wherein the concentration of surfactant in the surfactant-containing fluid is from 0.5 to 3.0 percent by weight.

15. A method as recited in claim 8 wherein steps (b) and (c) are repeated at least three times.

* * * * *